Jan. 13, 1942. E. H. KIECKBUSCH 2,269,670

BALANCE WEIGHT

Filed May 16, 1941

INVENTOR
EDWARD H. KIECKBUSCH
BY
Wheeler, Wheeler & Wheeler
ATTORNEYS.

Patented Jan. 13, 1942

2,269,670

UNITED STATES PATENT OFFICE 2,269,670

BALANCE WEIGHT

Edward H. Kieckbusch, Milwaukee, Wis., assignor to Harley-Davidson Motor Company, Milwaukee, Wis., a corporation of Wisconsin Application May 16, 1941, Serial No. 393,709

4 Claims. (Cl. 301—5)

My invention relates to improvements in spoked wheels.

The object of my invention is to provide simple and inexpensive means for accurately balancing motorcycle wheels and other spoked wheels subject to rapid rotation.

In the following description, reference is had to the accompanying drawing, in which—

Like parts are identified by the same reference characters throughout the several views.

Figure 1:
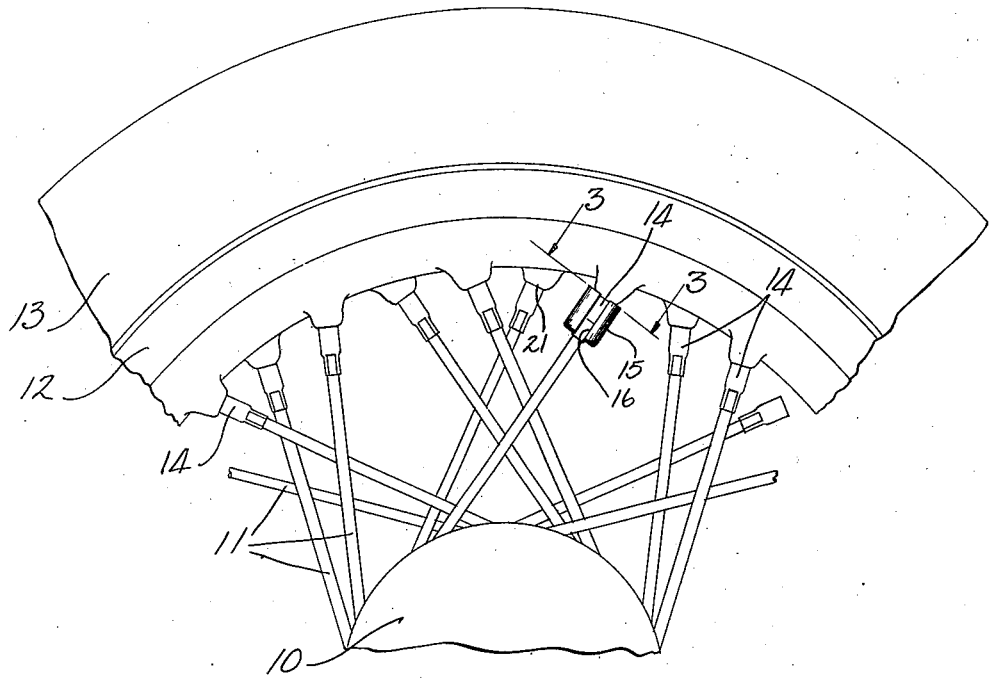
Figure 1 is a side elevation of a fragment of a motorcycle wheel showing one of my improved balancing weights in position on one of the spokes.
Figure 2:
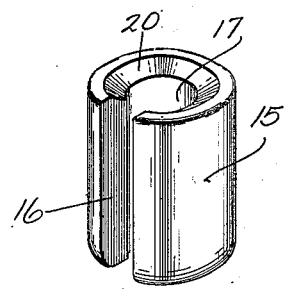
Figure 2 is a perspective view of one of the weights.
Figure 3:
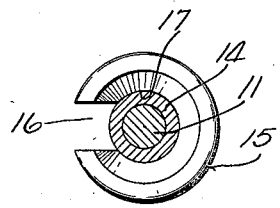
Figure 3 is a sectional view, drawn to line 3—3 of Figure 1.

The wheel hub 10, wire spokes 11, rim 12 and tire 13 may be assumed to be typical of any ordinary motorcycle wheel. In accordance with common practice, each spoke 11 has a larger portion at its outer end, preferably a nipple-shaped coupling, which connects it with the wheel rim 12.

In order to accurately balance the wheel, I employ one or more weights 15, each preferably of slightly resilient material, and provided with a longitudinal slot or channel 16 leading to a tubular bore 17 of larger diameter than the slot. The slot 16 and bore 17 may be aptly referred to as a key hole slot.

The slot 16 is of substantially the diameter of the spokes 11, and the bore 17 is of a diameter not exceeding, and preferably slightly less than that of the coupling nipple 14.

I prefer to make the weights 15 in the form of split sleeves, which can be freely adjusted to the spoke to be weighted, and then pushed radially and guided along the spoke until the inner surface of the bore is brought into engagement with the nipple 14. Thereupon, by pressure or impact, the weight may be forced into pressed fit relation to the nipple.

The weight is preferably formed with a concave depression 20 to receive the head 21 of the nipple when the weight is in its final position.

The wheel may be tested for balance before and after each weight is applied, and by using small weights, a very accurate balance can be obtained. When the wheel is in motion, each weight tends to move outwardly by centrifugal force, and under all conditions, the pressed fit grip of each weight upon its associated nipple is sufficient to keep it in place.

I claim:

1. The combination with a wheel spoke having a coupling nipple at its outer end, of a balancing weight having a key hole slot, the narrower portion of which substantially corresponds in width to the diameter of the spoke and the wider portion of which is adapted to receive the nipple, when the weight is forced into pressed fit relation thereto.

2. The combination of a wheel spoke having a portion enlarged at its outer end and a sleeve-like one piece balancing weight provided with a longitudinally extending slot of key hole type in which the intermediate portion of the spoke may be loosely received to guide the weight into engagement with the enlarged portion of the spoke, said weight and enlarged portion being adapted for fixed engagement with each other.

3. In a wheel, the combination with a spoke having predetermined cross section and provided adjacent its outer end with a portion of enlarged cross section, of a balancing weight comprising a member C-shaped in plan, with an inner longitudinal bore having a wall in pressed fit engagement with the enlarged portion of the spoke and a lateral slot opening from said bore throughout its length and adapted freely to pass the predetermined cross section of said spoke when the weight is displaced from said enlarged section.

4. A balancing weight for the spokes of wire wheels, said weight comprising a substantially cylindrical body of greater length than width provided with a longitudinal bore and a lateral slot opening to said bore throughout the length of said body.

EDWARD H. KIECKBUSCH.